United States Patent [19]
Schuermann

[11] Patent Number: 5,479,171
[45] Date of Patent: Dec. 26, 1995

[54] EXTENDED RANGE RF-ID TRANSPONDER

[75] Inventor: Josef H. Schuermann, Oberhummel, Germany

[73] Assignee: Texas Instruments Deutschland GmbH, Germany

[21] Appl. No.: 54,506

[22] Filed: Apr. 27, 1993

[51] Int. Cl.[6] .......................... G01S 13/75; G08B 29/00
[52] U.S. Cl. ................... 342/44; 342/51; 342/50; 152/152.1; 340/825.54
[58] Field of Search ................... 342/47, 44, 50, 342/51; 152/152.1; 340/825.54, 825.72

[56]     References Cited
U.S. PATENT DOCUMENTS

| | | | |
|---|---|---|---|
| 3,662,335 | 5/1972 | Fritze | 340/448 |
| 3,806,905 | 4/1974 | Strenglein | 340/505 |
| 3,911,434 | 10/1975 | Cook | 342/50 |
| 4,074,227 | 2/1978 | Kalmus | 340/447 |
| 4,450,431 | 5/1984 | Hochstein | 340/447 |
| 4,737,789 | 4/1988 | Nysen | 342/51 |
| 4,911,217 | 3/1990 | Dunn et al. | 152/152.1 |
| 5,025,492 | 6/1991 | Viereck | 342/144 |
| 5,053,774 | 10/1991 | Schuermann et al. | 342/44 |
| 5,073,781 | 12/1991 | Stickelbrocks | 342/51 |
| 5,126,745 | 6/1992 | Steinhagen et al. | 342/51 |
| 5,181,975 | 1/1993 | Pollack et al. | 152/152.1 |
| 5,218,861 | 6/1993 | Brown et al. | 73/146.5 |
| 5,270,717 | 12/1993 | Schuermann | 342/22 |
| 5,287,112 | 2/1994 | Schuermann | 342/42 |
| 5,287,113 | 2/1994 | Meier | 342/51 |
| 5,289,160 | 2/1994 | Fiorletta | 340/447 |
| 5,294,931 | 3/1994 | Meier | 342/44 |
| 5,347,930 | 12/1994 | Schuermann | 342/42 |
| 5,348,067 | 9/1994 | Myatt | 152/152.1 |
| 5,349,357 | 9/1994 | Schurmann et al. | 342/51 |
| 5,351,052 | 9/1994 | D'Hont et al. | 342/42 |
| 5,355,137 | 10/1994 | Schurmann | 342/42 |

FOREIGN PATENT DOCUMENTS

| | | | |
|---|---|---|---|
| 0299557A1 | 1/1989 | European Pat. Off. | |
| 0389406 | 3/1990 | European Pat. Off. | G06K 7/10 |
| 0505905 | 3/1992 | European Pat. Off. | G06K 7/10 |
| 0505906 | 3/1992 | European Pat. Off. | G06K 7/10 |

Primary Examiner—John B. Sotomayor
Attorney, Agent, or Firm—Brian C. McCormack; James C. Kesterson; Richard L. Donaldson

[57]     ABSTRACT

An transponder arrangement (10) for use with tires (20) is described. The arrangement (10) includes an antenna (14) which is mounted about the tire's (20) perimeter. The antenna (14) preferably has a coupling coil (16) at one end. A transponder (12) is preferably located close to the coupling coil (16) and is preferably loosely coupled to the coupling coil (16). The RF-ID efficiency of the arrangement (10) is generally optimized for this type of application by the long but narrow antenna solution and by the simple fact that coupling an antenna (14) to a transponder (12) amplifies the emission of the transponder's signal relative to the noise, thus improving the signal-to-noise ratio of the RF-ID system. The degree of coupling between the antenna (14) and the transponder (12) is not particularly critical. The antenna (14) acts to extend the reading range for the interrogator (24) to be generally, radially symmetric about the tire (20). Other arrangements are disclosed.

19 Claims, 2 Drawing Sheets

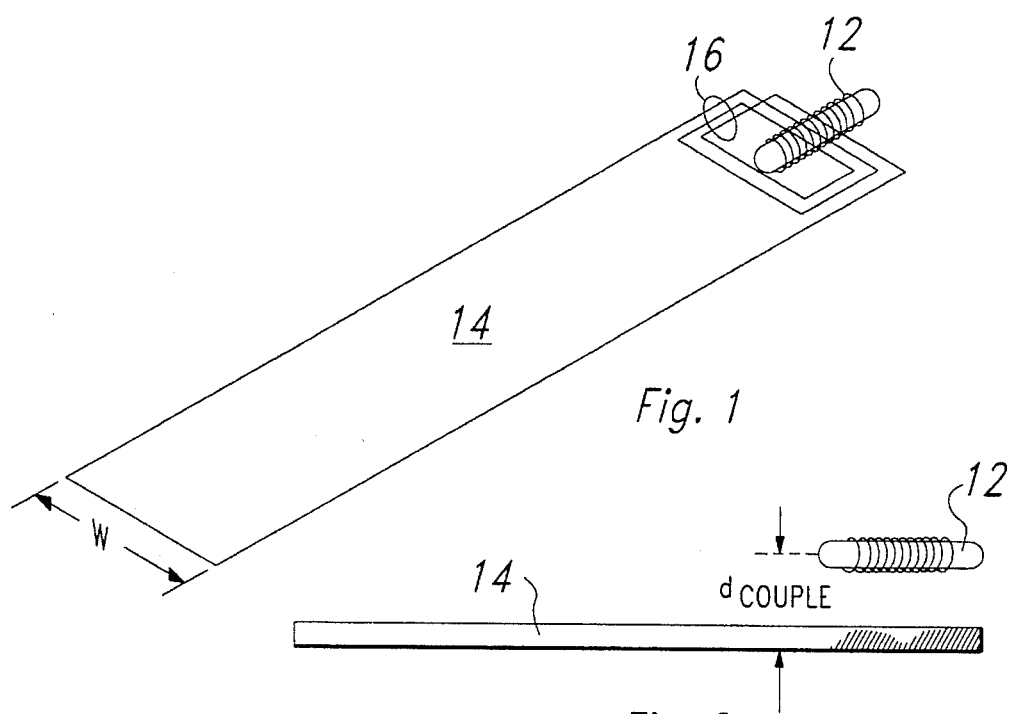
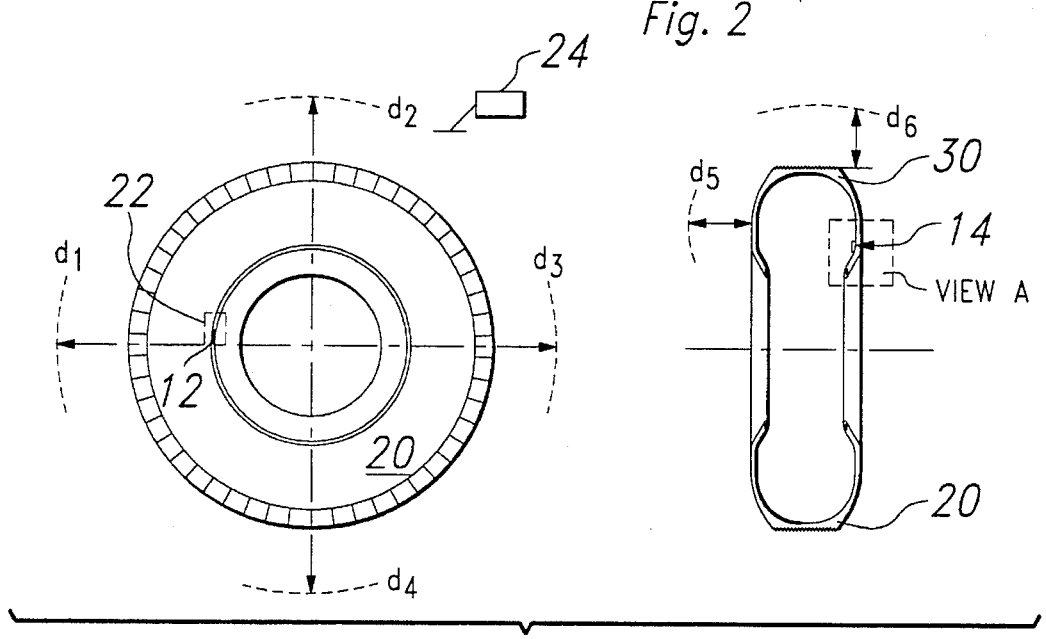

EXTENDED RANGE RF-ID TRANSPONDER

CROSS-REFERENCE TO RELATED PATENTS

The following coassigned patent applications are hereby incorporated herein by reference:

| U.S. Pat. No. / U.S. Pat. application no. | Filing Date | TI Case No. |
|---|---|---|
| 07/858,247 | 03/26/92 | TI-17066 |
| 07/981,635 | 11/25/92 | TI-16688 |

1. Field of the Invention

This invention generally relates to the extension of a planar and/or vertical reading range in existing interrogator/transponder RF-ID systems and modification of the shape of the inherent transponder or reader antenna pattern to better meet specific applications. This invention relates more specifically to extension of the reading range in interrogator/transponder RF-ID systems in applications where the transponder is assembled into tires for identification by an interrogator.

2. Background of the Invention

Applications of RF-ID systems have been used within the tire industry to identify and monitor tires within warehouses or in actual operation mounted to vehicles. Ideally, because the angular position of the tire is not known, the reading range by an interrogator would be symmetric about the circumference of the tire. Prior art systems might forego this ideal characteristic symmetry, thereby causing difficulties in obtaining consistent communications between the interrogator and the transponders. Other prior art systems such as described in the PCT patent application 90/12474 have used a loop antenna, but have required an electrical contact between an IC or other control circuitry and an antenna which is routed about the tire's circumference. This use presents difficulties in maintaining a hermetic seal about the electronic circuitry. Such a system is further more difficult to manufacture and is less mechanically reliable. Furthermore, the reading range is reduced in prior art systems having a loop antenna because the loop connected to the transponder yields a lossy, lower Q-factor antenna.

Yet another prior art system is disclosed in U.S. Pat. No. 5,181,975 by Pollack et al. The system is a tire identification system. As described by Pollack et al. the invention uses an annular tensile member comprising a bead of the tire. The annular tensile member, during transponder interrogation, acts as the primary winding of a transformer. The transponder itself has a coil antenna that is loosely coupled to the primary winding and is the secondary winding of the transformer. The coil antenna is substantially planar in shape, and, when positioned between the innerliner of the tire and its carcass ply, the transponder may include a pressure sensor responsive to tire inflation pressure. Unfortunately, use of the bead as the winding of a transformer is somewhat hampered by the fact that the bead is an integral part of the design of the tire itself. When designing the bead for a tire a great number of physical characteristics of the bead must be considered in view of many environmental variables, variables such as the tire mounting procedures, wheel characteristics, and vehicle cornering, breaking, acceleration, speed, and other operating variables. Thus the bead design cannot be optimized for use as a winding of a transformer.

SUMMARY OF THE INVENTION

The use of an antenna separate from the integral components of the tire itself allow the problems described hereinabove to be overcome in improved and novel ways. In the preferred embodiment a single steel or copper wire antenna is routed loosely or meanders about the circumference of the tire sidewall to provide for expansion and avoid stress during the manufacturing process and operating life. Preferably, the antenna is elastic to stretch with expansions and contractions during the tire's operating life. The antenna has a coupling coil at one end which located close to the transponder. The transponder is magnetically coupled to the coupling coil. This magnetic coupling eliminates the need for a galvanic contact between the transponder and the antenna. Further, the transponder can be easily hermetically sealed. The coupling of the coupling coil to the coil transponder is preferably loose for a tuned-type transponder to maintain the high "Q" and to avoid detuning and damping of the transponder coil. Both effects of lowering the "Q" and detuning or damping the transponder may adversely affect the receiving function of the transponder and the reading range of the transponder. The RF-ID efficiency of the arrangement is generally optimized for this type of application by the long but narrow antenna solution and by the simple fact that coupling an antenna to a transponder, amplifies the emission of the transponder's signal relative to the noise, thus improving the signal-to-noise ratio of the RF-ID system. The transponder is mounted by an adhesive patch or other means in proximity to the coupling coil. The coupling distance between the antenna and the transponder is not particularly critical. The antenna acts to extend the reading range for the interrogator to be a long range which is generally, radially symmetrical about the tire.

BRIEF DESCRIPTION OF THE DRAWINGS

FIG. 1 shows the transponder/antenna configuration according to the invention;

FIG. 2 shows a transponder within a coupling distance of the coupling coil of the antenna;

FIG. 3 shows the preferred embodiment transponder loosely coupled to the antenna within a tire;

FIGS. 4a–b show exemplary cross sections for View A referenced in FIG. 3;

DETAILED DESCRIPTION OF THE PREFERRED EMBODIMENTS

FIG. 1 shows a first preferred embodiment of the extended range transponder/antenna arrangement 10. The transponder 12 is loosely coupled to the coupling coil 16. Coupling coil 16 is at one end of the long and narrow antenna 14. The coupling coil 16 consists of, for example, 3–4 windings. Although one example of providing loose coupling between the coupling coil 16 and the transponder 12 has been described, there are several methods in which to provide the loose coupling to the transponder as will be appreciated by one of ordinary skill in the art. For example, the coupling coil 16 might be a printed flat coil. As other alternatives: a single winding coil 16 could be used; or, the transponder might couple directly to the antenna 14. Indeed any number of windings from none to many could be used to advantage.

Figure 5:
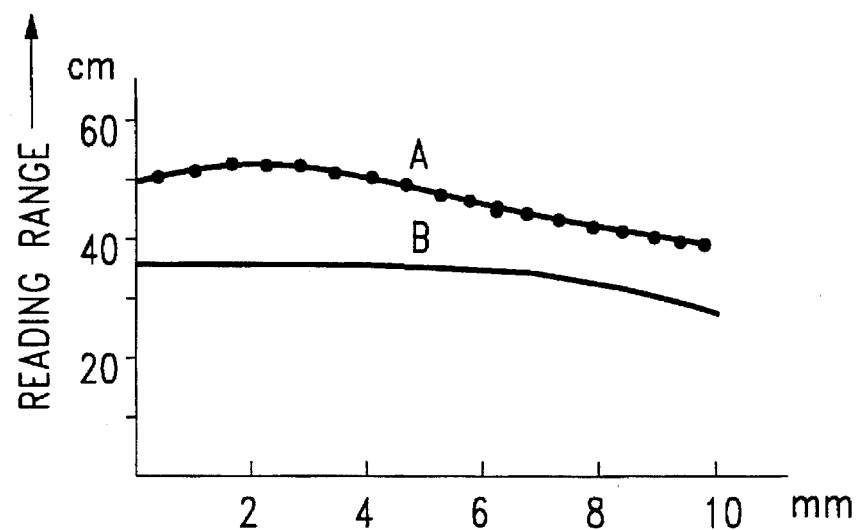
FIG. 5 shows a graph illustrating the uncritical relation of the reading range to the coupling distance, $d_{couple}$.
Figure 6:
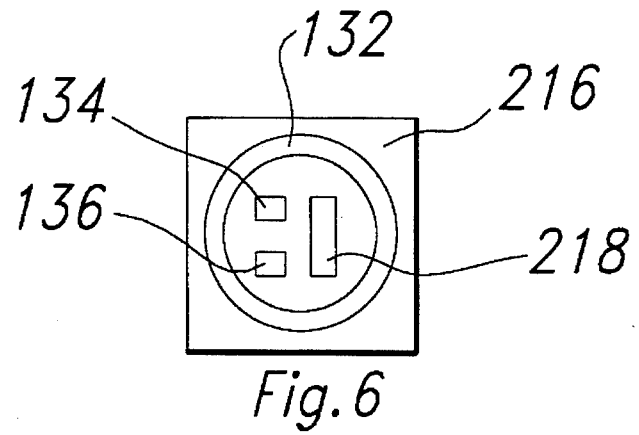
FIG. 6 is a first possible physical construction of a transponder.
Figure 7:
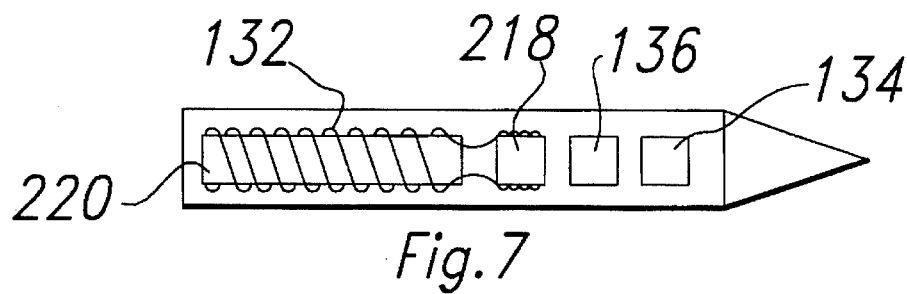
FIG. 7 is a second possible physical construction of a transponder.

In embodiments of the invention as shown in FIGS. 6–7, the integrated circuit 218 of the transponder 12 may be surrounded by an annular transponder coil 132. Since the components of the transponder 12 can be made very small it is even possible to make the entire unit in the form of a small pin as in FIG. 6 that can be placed in close proximity to the coupling coil 16. The coil 132 in this example could be wound round a small ferrite core 220, and FIG. 2 shows a transponder 12 within a coupling distance $d_{couple}$ of the coupling coil 16 of the antenna 14. The effect of the coupling distance, $d_{couple}$ and use of different materials for the antenna 14 is shown in FIG. 5. As can be seen in FIG. 5, the coupling distance $d_{couple}$ is not critical and is typically between 1 and 10 mm. The effective reading range is somewhat dependent on the width of the antenna, W. The width, W, is preferably at least 1 cm. Also shown in FIG. 5 is the relative reading range for using steel (the "A" graph) or copper (the "B" graph) as the antenna 14. Other materials might be used to advantage by one of ordinary skill in the art. The skilled artisan would select a material based on well-known properties such as conductivity, strength, coefficients of expansion, and compatibility with the tire material. It is therefore intended that the appended claims encompass any such modifications or embodiments.

FIG. 3 shows the preferred embodiment transponder 12 loosely coupled to the antenna 14 within a tire 20. As mentioned, the antenna 14 extends the effective reading range between the interrogator 24 and the transponder 12. The dashed lines of FIG. 3 illustrate the bounds of a typical reading range for the preferred embodiment system. The measurements given relating to the dashed lines are with respect to the perimeter of the tire 20. Measurement $d_1$ is the distance from the perimeter of the tire at the angular position of zero degrees with respect to the transponder (i.e., the position closest to the transponder 12). A typical measurement for $d_1$ is approximately 20 cm. Typical measurements for $d_2$, $d_3$, and $d_4$ which are located at 90, 180, and 270 degrees, respectively, in relation to the angular position of the transponder 12.

FIGS. 4a–b show exemplary cross sections of View A from FIG. 3. FIG. 4a shows the exemplary cross section for the mounting of antenna 14 on the sidewall 30 of a tire 20. The attachment method for this particular embodiment might be to affix the antenna 14 and the transponder 12 using a patch 32. FIG. 4b shows the exemplary cross section for the mounting of antenna 14 within the sidewall of the tire 20 in an integrated manufacturing process in which the antenna and transponder might be formed directly within the structure of the sidewall 30 of the tire 20.

According to a preferred embodiment of the invention, the transponder/antenna configuration is easily applied to a more detailed example of an RF-ID system. For example, this RF-ID system has a transponder 12 with an identification code, which when attached to an object, identifies and discriminates one object from another. The coupling coil 16 is loosely coupled to the transponder 12, and the transponder/antenna configuration of FIG. 1 is attached to a tire 20. When a read is wanted to locate a particular tire 20, the hand-held interrogator 24 is held within the extended range of the transponder 12, and an interrogation pulse is transmitted. The transponder 12 receives, rectifies and stores the interrogation pulse energy, and transmits an identification code in response to an adequate amount of interrogation energy received. The hand-held interrogator 24 receives the identification code from the transponder 12 and processes the identification code as desired. One advantage of having the transponder/antenna arrangement 10 versus having just the transponder 12 attached to the tire 20, is the greater flexibility in locating the hand-held interrogator 24 when performing a read of the transponder identification code. Due to the transponder/antenna arrangement 10, the hand-held interrogator can identify the tire 20 anywhere along the perimeter of tire 20, instead of in the relatively immediate area of the transponder.

According to another preferred embodiment of the invention, the transponder/antenna configuration is applied to an RF-ID system in which sensory information is read from the transponder 12. In this embodiment, the transponder is typically activated during a powering phase. During this phase a continuous wave signal would be sent from the an interrogator 24 to the transponder 12. After a predetermined period of time, the interrogator ceases the continuous wave power signal and may then transmit command data to the transponder 12. Because the extended range antenna described in this application is equally effective for coupling interrogation signals into the transponder as for transmitting response signals from the transponder, the range over which the commands can be sent to the transponder 12 is increased. Further, the range over which the transponder can be powered is also increased. Once the transponder 12 has been commanded by the interrogator 24 to perform an action such as read a sensor or another action, the transponder 12 is then operable to enable the sensor (if necessary) and to digitize the data read from the sensor. For example, this sensor might return a pressure or temperature reading from within the tire. In this exemplary procedure for working with sensory RF-ID systems, the transponder then stores this information in a shift register. Upon completion of the digitizing and storage of the sensory information, the transponder 12 then can return this information by modulating a carrier with the data stored in the shift register. This data might include relative sensory information with calibration information such that the interrogator 24 can calculate the absolute sensory information, or the transponder 12 might calculate the absolute sensory information and pass this information directly on to interrogator 24. An example of how the reading and writing procedures might be implemented is provided in coassigned U.S. patent application Ser. No. 07/981,635, incorporated by reference in the instant application.

A few preferred embodiments have been described in detail hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An RF-ID arrangement for use in a tire or other object to be identified by an interrogator operable to send a wireless RF interrogation signal, said arrangement comprising:
    a single-ended antenna located approximately circumferencially on said object for receiving said wireless RF interrogation signal from said interrogator and for transmitting a wireless response signal;
    an antenna coupling coil attached to one end of said single-ended antenna and in electrical communication therewith; and
    a transponder located on said object, said transponder having a transponder coupling coil and located in close proximity to said antenna coupling coil and magnetically coupled thereto, said transponder being operable to receive said RF interrogation signal and operable to generate said wireless response signal.

2. The RF-ID arrangement of claim 1 wherein interrogator and said transponder are in full duplex communication.

3. The RF-ID arrangement of claim 1 wherein said interrogator and said transponder are in half duplex communication.

4. The arrangement according to claim 1, wherein said antenna coupling coil is loosely coupled to said transponder.

5. The arrangement according to claim 4, wherein said coupling coil is wrapped loosely around said transponder.

6. The arrangement according to claim 1, wherein said wherein said transponder is a self-contained, hermetically sealed transponder.

7. The arrangement according to claim 4, wherein said object is a tire.

8. The arrangement according to claim 7, wherein said transponder is fixedly attached to said tire in close proximity to said coupling coil.

9. The arrangement according to claim 8, wherein said transponder is fixedly attached with an adhesive patch.

10. The arrangement according to claim 9, wherein said transponder is fixedly attached to said tire within 10 mm.

11. The arrangement according to claim 1, wherein said antenna is copper.

12. The arrangement according to claim 1, wherein said antenna is steel.

13. An RF-ID arrangement for use in a tire to be identified by an interrogator unit operable to send a wireless RF interrogation signal, said arrangement comprising:
    a tire;
    a transponder located on said tire, said transponder having a transponder coupling coil, said transponder being operable to receive said interrogation signal and to generate a transponder response signal;
    an single-ended antenna located approximately circumferencially on said tire for receiving said interrogation signal and for transmitting said transponder response signal; and
    an antenna coupling coil electrically connected to said end of said antenna and located in close proximity to said transponder coupling coil and magnetically coupled thereto, said coupling coils for magnetically coupling said interrogation signal from said antenna to said transponder and for magnetically coupling said transponder response signal from said transponder to said antenna.

14. The arrangement according to claim 13, wherein the radiation pattern of said antenna lies circumferencially about said object.

15. The arrangement according to claim 13, wherein said antenna is copper.

16. The arrangement according to claim 13, wherein said antenna is steel.

17. The arrangement of claim 14 and further comprising a sensor located in proximity to said object, said sensor operable to measure a selected parameter and provide sensory information to said transponder.

18. The arrangement of claim 17 wherein said interrogator sends command data to said transponder instructing said transponder which parameter to measure using said sensor.

19. The arrangement of claim 18 wherein said transponder is operable to transmit a transponder response signal containing said sensory information from said transponder.

* * * * *